United States Patent
Hall-Goulle et al.

(10) Patent No.: US 7,108,742 B2
(45) Date of Patent: Sep. 19, 2006

(54) INK COMPOSITIONS CONTAINING LANTHANIDE COMPLEXES

(75) Inventors: Véronique Hall-Goulle, Dornach (CH); Stefan Koller, Ramlinsburg (CH); Mickael Mheidle, Sausheim (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/503,153

(22) PCT Filed: Feb. 18, 2003

(86) PCT No.: PCT/EP03/01620

§ 371 (c)(1),
(2), (4) Date: Jul. 28, 2004

(87) PCT Pub. No.: WO03/072664

PCT Pub. Date: Sep. 4, 2003

(65) Prior Publication Data

US 2005/0119368 A1 Jun. 2, 2005

(30) Foreign Application Priority Data

Feb. 26, 2002 (EP) .................................. 02405139

(51) Int. Cl.
- C09D 11/00 (2006.01)
- B05D 1/32 (2006.01)
- B05D 3/02 (2006.01)
- C09K 11/06 (2006.01)

(52) U.S. Cl. ............... 106/31.27; 106/31.6; 106/31.43; 106/31.75; 106/31.47; 106/31.49; 106/31.77; 106/31.78; 252/301.16; 252/301.34; 252/301.35; 427/466; 427/511; 427/394

(58) Field of Classification Search ............. 106/31.27, 106/31.6, 31.43, 31.75, 31.47, 31.49, 31.77, 106/31.78; 252/301.16, 301.35, 301.34; 523/160; 427/466, 511, 394
See application file for complete search history.

(56) References Cited

U.S. PATENT DOCUMENTS

| | | | |
|---|---|---|---|
| 3,473,027 A | 10/1969 | Freeman et al. | 250/71 |
| 4,736,425 A | 4/1988 | Jalon | 380/59 |
| 4,891,505 A * | 1/1990 | Jalon | 235/491 |
| 5,158,703 A * | 10/1992 | Takuma et al. | 252/301.35 |
| 5,837,042 A * | 11/1998 | Lent et al. | 106/31.14 |
| 6,071,632 A * | 6/2000 | Hall-Goulle | 428/690 |
| 6,846,350 B1 * | 1/2005 | Imanishi et al. | 106/31.14 |
| 2003/0110979 A1 * | 6/2003 | Imanishi et al. | 106/31.14 |

FOREIGN PATENT DOCUMENTS

| | | | |
|---|---|---|---|
| JP | 63/191870 | * | 8/1988 |
| JP | 64/006085 | * | 1/1989 |
| JP | 03/050291 | * | 3/1991 |
| JP | 2002037791 | * | 2/2002 |
| JP | 2002/173622 | * | 6/2002 |
| WO | 96/20942 | | 7/1996 |
| WO | 97/10307 | | 3/1997 |

OTHER PUBLICATIONS

Derwent abstract of JP03/050291, Mar. 1991.*
Derwent abstract of JP2002/173622, Jun. 2002.*
Derwent abstract of JP63/191870, Aug. 1988.*
Derwent abstract of JP01/006085, Jan. 1989.*
Derwent abstract of JP2002037791, Feb. 2002.*
Derwent Abstract 1999-017829 [02] for JP 10287043, Oct. 1998.
Derwent Abstract 79-05039B for JP 53140105, Dec. 1978.

* cited by examiner

Primary Examiner—Helene Klemanski
(74) Attorney, Agent, or Firm—Joseph C. Suhadolnik; Tyler A. Stevenson

(57) ABSTRACT

The invention relates to an ink composition containing (a) a compound of formula (I), $L_m$–$Ln^{3+}(Ch^-)_n$ (I), wherein Ln represents a lanthanide, $CH^-$ is a negatively charged ligand containing at least one UV absorbing double bond, n denotes 3 or 4, m denotes a number from 1 to 4, in case n is 3, m denotes a number from 1 to 4 and L is a neutral monodentate or polydentate nitrogen-, oxygen- or sulfur-containing UV absorbing ligand with the exception of 2,2'-bipyridyl or, in case n is 4, m denotes 1 and L is a single-charged cation; and (b) a liquid ink carrier, which can be used for applying hidden mark on objects which can only be revealed under UV exposure.

18 Claims, No Drawings

INK COMPOSITIONS CONTAINING LANTHANIDE COMPLEXES

The present invention relates to ink compositions containing lanthanide$^{III}$ complexes, a system for marking items with a hidden mark and a method for providing hidden marks on objects.

There is a need for applying hidden marks which can only be revealed under UV exposure on a variety of articles for several reasons.

Thus, security markings are needed on envelopes, checks, bank-bills shares, securities, stamps, identity cards, passports, tickets, certificates etc.

Textiles are also furnished with such covert designs which may act as security markings or as special decorations which only become visible under UV radiation.

WO 97/10307 discloses a jet ink composition suitable for marking on white or light coloured substrates comprising an ink carrier and a fluorescent colorant which is a rare earth metal organic chelate. Those fluorescent colorants are excitable in the UV radiation in the range of from about 275 nm to about 400 nm and fluoresce in the visible range. However, the intensity of the luminescence and the quantum yield do not meet the most superior requirements.

It is therefore an object of the present Invention to provide an ink composition comprising a colorant which is invisible to the unaided eye but yields a strong luminescence under UV exposure and which composition can be used for all known printing applications on various substrates such as textiles including leather, cellulosic materials, metals, plastic materials, other substrates coated with an oligomeric or polymeric matrix and other porous materials.

The invention relates to an ink composition containing (a) a compound of formula I

$$L_m\text{-}Ln^{3+}(Ch^-)_n \qquad (I),$$

wherein Ln represents a lanthanide,

Ch⁻ is a negatively charged ligand containing at least one UV absorbing double bond, n denotes 3 or 4, m denotes a number from 1 to 4, in case n is 3, m denotes a number from 1 to 4 and L is a neutral monodentate or polydentate nitrogen-, oxygen- or sulfur-containing UV absorbing ligand with the exception of 2,2'-bipyridyl or, in case n is 4, m denotes 1 and L is a single-charged cation; and (b) a liquid ink carrier.

The compounds of formula I can basically contain any monodentate or polydentate nitrogen-, oxygen- or sulfur-containing UV absorbing ligand such as, for example, unsubstituted or substituted pyridine, pyrazine, quinoline, aniline, phenanthroline, terpyridine, imidazole, benzimidazole, bisimidazole, bisbenzimidazole, pyrimidine, bipyrimidine, naphthyridine, triazine, bistriazine, oxazole, bisoxazole, oxazoline, bisoxazoline and substituted derivatives thereof and all relevant (poly)N-oxide derivatives of above cited ligands.

Since L can be a polychelating ligand, like for example 4,4'-bipyridyl, the compounds of formula I and II include multimetallic chelates, such as for example the compound of formula (XIV), containing two M$^{III}$-(diketone)$_3$ or M$_{III}$-(carboxylate)$_3$ units connected via a bidentate ligand:

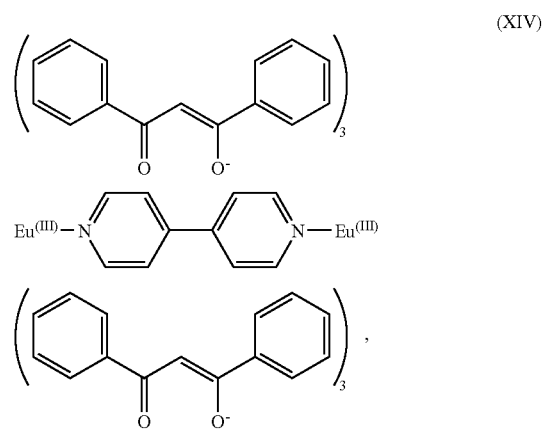

(XIV)

Preferred ink compositions contain as component (a) a compound of formula II, III or IV

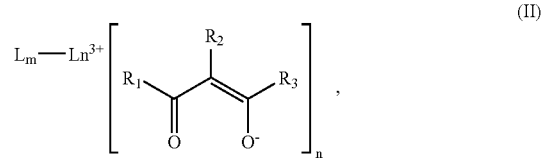

(II)

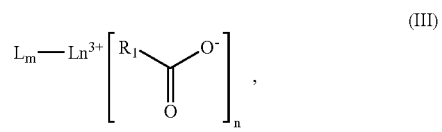

(III)

$$L_m\text{—}Ln^{3+}[R_1\text{—}O]_n, \qquad (IV)$$

wherein Ln represents a lanthanide, n denotes 3 or 4, m denotes a number from 1 to 4 in case n is 3, m denotes a number from 1 to 4 and L is a neutral monodentate or polydentate nitrogen-, oxygen- or sulfur-containing UV-absorbing ligand with the exception of 2,2'-bipyridyl or, in case n is 4, m denotes 1 and L is a single-charged cation, $R_2$, is hydrogen or $C_1$–$C_6$alkyl, and $R_1$ and $R_3$ are each independently of the other hydrogen, $C_1$–$C_6$alkyl, $CF_3$, $C_5$–$C_{24}$aryl or $C_4$–$C_{24}$heteroaryl.

Preferably L is a nitrogen-containing ligand.

Particularly preferred are compounds of formula I, wherein L is a compound of formula V, VI, VII, VIII or IX

(V)

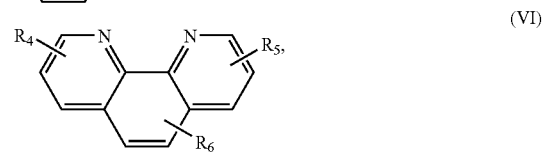

(VI)

-continued

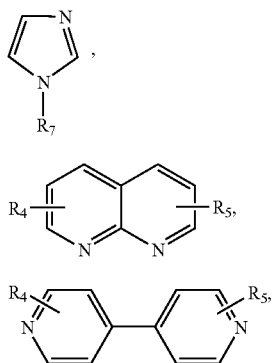
(VII)

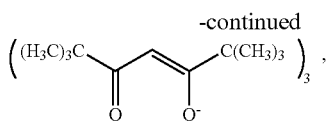
(XI)

(VIII)

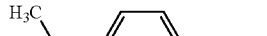

(IX)

(XII)

wherein $R_4$, $R_5$ and $R_6$ are each independently of the other hydrogen, halogen, $C_1$–$C_6$alkyl, $C_5$–$C_{24}$aryl, $C_6$–$C_{24}$aralkyl, $C_1$–$C_6$alkoxy, dialkylamino or a cyclic amino group and $R_7$ is hydrogen, $C_1$–$C_6$alkyl, $C_5$–$C_{24}$aryl or $C_6$–$C_{24}$aralkyl.

Alkyl groups as substituents $R_1$ to $R_7$ can be straight-chain or branched. Examples that may be mentioned are methyl, ethyl, n-propyl, isopropyl, n-butyl, sec-butyl, isobutyl, tert-butyl, n-pentyl, neopentyl, isopentyl, n-hexyl and isohexyl.

Alkoxy groups as substituents $R_4$ to $R_6$ can be, for example, methoxy, ethoxy, n-propoxy, isopropoxy, n-butoxy or tert-butoxy.

Examples of $C_5$–$C_{24}$aryl groups are phenyl, tolyl, mesityl, isityl, diphenyl, naphthyl and anthryl. Phenyl is preferred.

Heteroaryl group preferably contain 4 or 5 C atoms and one or two heteroatoms selected from O, S and N. Examples are pyrrolyl, furanyl, thiophenyl, oxazolyl, thiazolyl, pyridyl, pyrazinyl, pyrimidinyl, pyridazinyl, indolyl, purinyl or chinolyl.

Aralkyl groups as substituents $R_4$ to $R_7$ can be, for example, benzyl, 2-phenylethyl, tolylmethyl, mesitylmethyl and 4-chlorophenylmethyl.

Suitable dialkylamino groups are, for example, diethylamino, diisopropylamino, di-n-propylamino, N-methyl-N-ethylamino and, in particular, dimethylamino or pyrrolidino.

Suitable cyclic amino groups are pyrrolidino and piperidino.

Halogen atoms as substituents $R_4$ to $R_6$ are preferably fluorine, chlorine or bromine, but in particular chlorine.

Preferred ink compositions according to the invention contain as component (a) a compound of formula I, wherein L is a compound of formula V, VI, VII, VIII or IX wherein $R_4$, $R_5$ and $R_6$ are hydrogen, methyl, dimethylamino or pyrrolidino.

Preferred components (a) are compounds of formula I wherein Ln is Eu, Tb or Dy.

Furthermore, compounds of formula II, III or IV are preferred, wherein $R_1$ and $R_3$ are methyl, t-butyl, n-pentyl or phenyl.

$R_2$ in formula II is preferably hydrogen.

Particularly preferred as component (a) are the compounds of formula X, XI, XII, XIII, XIV or XV.

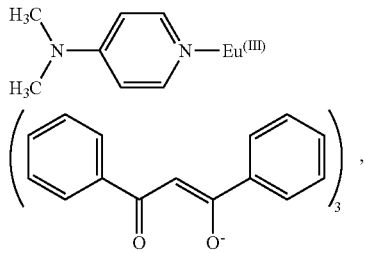

(XIII)

(XIV)

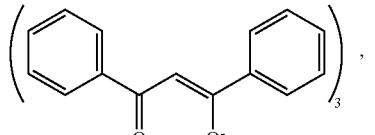

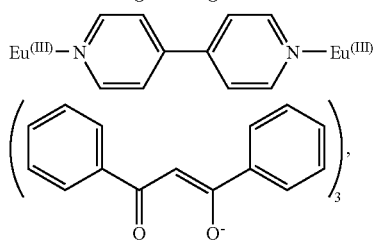

(XV)

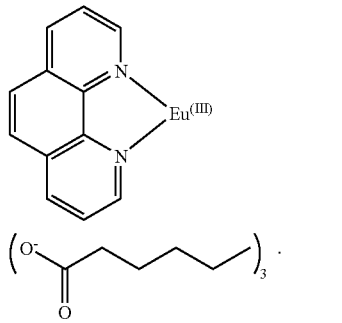

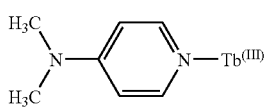
(X)

For certain applications it is recommendable to use a combination of different lanthanides, for example Eu and Tb. Such a mixture increases the degree of security of the hidden marks, the sophistication of the security level and multiplies the coding possibilities.

The compounds of formula I are known, for instance from WO 96/20942, or can be prepared by methods known per se. For example, a ligand such as acetylacetone, benzoylacetone, dibenzoylmethane, dipivaloylmethane, salicylic acid, valeric acid or caproic acid can be reacted under suitable conditions with a rare earth metal halide such as europium trichloride to produce the rare earth metal chelate. Further details can be found in U.S. Pat. No. 4,736,425.

The rare earth metal chelate so obtained can be further reacted with the monodentate or polydentate nitrogen-, oxygen- or sulfur-containing ligand L thus yielding the rare earth metal chelate compounds of formula II, III and IV.

This reaction is described, for example, in WO 96/20942.

Any suitable ink carrier known in the art of printing compositions, including aqueous and organic carriers and combinations thereof, can be used to prepare the ink compositions of the present invention. The carrier should have sufficient solubility for the compounds of formula I or II and, where appropriate, for the additional ingredients of the ink compositions. In addition, the carrier should be easily dissipatable from the printed article by evaporation and/or absorption in the substrate. Suitable organic carriers include alcohols, glycols, ether alcohols, sulfoxides, amides, amines, heterocyclic solvents, ketones, ethers, esters, nitrites and aliphatic, cycloaliphatic and aromatic hydrocarbons.

Examples of suitable organic solvents are methanol, ethanol, n-propanol, isopropanol, n-butanol, glycerol, ethylene glycol, propylene glycol, diethylene glycol, dipropylene glycol, polyethylene glycol, polypropylene glycol, ethylene glycol monoethylether, ethoxybutanol, dimethylsulfoxide (DMSO), dimethylformamide (DMF), dimethylacetamide (DMA), N-methylpyrrolidone (NMP), acetone, 2-butanone, diethylether, di-n-propylether, tetrahydrofurane (THF), ethyl acetate, ethyl propionate, acetonitrile, pyridine, n-pentane, n-hexane, cyclohexane, benzene and toluene.

Preferably the ink carrier (b) is an organic solvent, a mixture of two or more organic solvents or a mixture of water and one ore more organic solvents.

For solvent-based applications it is advisable to employ alcohols, ketones, esters, polyethers or aromatic hydrocarbons or mixtures of the aforementioned solvents as ink carrier.

Solvents which are miscible with water, like alcohols, glycols, ether alcohols, nitrites, DMSO, DMF, DMA, NMP, THF and acetone, are purposively used for aqueous applications.

Preferred organic solvents are aliphatic alcohols, glycols, etheralcohols, dimethylsulfoxide (DMSO), dimethylformamide (DMF), dimethylacetamide (DMA), N-methylpyrrolidone (NMP), aliphatic or aromatic ketones, aromatic hydrocarbons, carboxylic acid esters and aliphatic polyethers.

Glycerol, ethylene glycol and propylene glycol are especially preferred organic solvents.

The ink compositions according to the invention may additionally comprise one ore more binder resins (c).

The binder resin serves to immobilize or increase the adhesion of the colorant, particularly on non-porous articles such as for example plastic, metallic materials and glassine materials. Any suitable binder resin can be used. Preferably the binder resin is soluble, dispersible or emulsifiable in the ink carrier. It is further preferred that the binder resin has sufficient adhesion to the substrate following the dissipation of the ink carrier.

Examples of suitable binder resins include alkyds, acrylics, acrylates, acrylic latexes, epoxy resins, polyvinylpyrrolidon, polyurethanes, vinyl resins, polyvinyl acetates, polyvinylalcohol, polyvinylbutyral, PVC, chlorinated rubber, polycaprolactone, polyethyleneglycol esters of fatty acids, polyalkenes such as polyethylene, polypropylene and polybutylene, polystyrene, poly-α-methylstyrene, copolymers of polyethylene with vinyl acetate, polysulfones, polyesters, polysiloxanes, styrene butadiene, styrene-acrylic copolymers, polyacrylics, polyacrylates such as polymethylacrylate and polymethylmethacrylate, nitrocellulose and cellulose ethers such as methylcellulose and ethylcellulose, and mixtures thereof.

The compositions according to the invention are well compatible with all conventional aqueous and solvent-based printing formulations known in the art. Some of these printing formulations are commercially available.

In preferred ink compositions according to the invention the binder resin (c) is selected from the group consisting of polyacrylics, polyacrylates, polyurethanes, polyurethane-acrylates, styrene-acrylic copolymers, nitrocellulose and ethylcellulose.

Aqueous ink jet formulations containing polyacrylics, polyacrylates, polyurethanes or polyurethane-acrylates as binder resin (c) are particularly preferred.

In the compositions according to the present invention the amounts of components (a) and (b) and where appropriate (c) can vary within wide ranges.

Preferred compositions contain 0.01 to 70.0%, more preferably 0.05 to 30% and in particular 0.1 to 10.0%, by weight of component (a) and 30.0 to 99.99%, more preferably 70.0 to 99.95% and in particular 90.0 to 99.9%, by weight of component (b), based on the total amount of components (a)+(b).

High amounts of component (a) are usually well-suited for the ink concentrate in solvent-based applications.

The amount of component (c) depends on the printing application which determines the required viscosity and the required fixation properties to the substrate. Preferably, the amount of component (c) is 0.5 to 70%, more preferably 1 to 50% and in particular 1 to 30%, by weight, based on the total amount of components (a)+(b)+(c).

Further ingredients which may be present in the ink compositions according to the invention are e.g. natural or synthetic thickeners, dyes, pigments, optical brighteners, acids, bases and/or salts to adjust the pH to the desired value, anionic, nonionic or cationic surfactants, antifoaming and antifrosting agents, biocides, bactericides, electrolytes, humectants, fragrance, softeners and fixing agents.

Especially preferred are compositions according to the invention additionally containing (d) one or more colorant(s).

Suitable colorants are the well-known pigments and dyes including mixtures of different pigments and dyes.

The ink compositions according to the invention can be prepared by any suitable method known to those of ordinary skill in the art. For example, the components of the composition can be combined and mixed in a suitable mixer or blender.

The present invention further provides a system for marking items with a hidden mark which can only be revealed under UV exposure comprising a printing means for printing said mark on said items, wherein said printing means employs an ink composition as described above.

The marking system may additionally include a transport system to carry the items to the printing means. For example, the items can be carried under the print head of an ink jet printer using a conveyor belt.

The present invention further relates to a method for providing a hidden mark on an object, preferably a textile material, comprising applying onto said object an ink composition as described above and removing all or substantially all of said ink carrier by evaporation or absorption into or onto said object.

The hidden mark can also be hidden into a visible mark, either by overprinting onto a visible mark or by using a coloured formulation, as described in the working examples.

The hidden mark can be made visible by subjecting the object to exciting radiation having a wavelength of from about 275 nm to about 400 nm; the emitted fluorescent radiation is in the visible range, preferably from about 450 nm to about 700 nm. The emission spectrum contains a sharp emission peak.

The invention can be applied in all customary printing applications like flexographic printing, offset printing, screen printing, ink-jet printing, transfer printing and textile printing.

A wide variety of substrates can be marked with the fluorescing colorant according to the invention such as textile materials (wool, cotton, leather, silk, polyamide, polyester, mixed fibers, polyacrylonitrile, lycra), cellulosic materials (wood, paper), metals as well as plastic materials (polyethylene, polypropylene, polyethylene terephthalate, polybutylene terephthalate), porous materials, any other substrate coated with a receiving polymeric or oligomeric matrix, or which can be coated with a polymeric or oligomeric matrix as provided by the binder system (c).

The present invention makes it possible to apply colourless or coloured hidden marks to various colourless, white, pale coloured or dark coloured substrates, which can be revealed under UV exposure. The compositions according to the invention distinguish from analogous prior art compositions by outstanding luminescence quantum yield, long-lasting luminescence and high luminescence intensity.

The following Examples illustrate the invention.

Ink Composition A:
Concentrate of compound XII in 1,2-propylene glycol

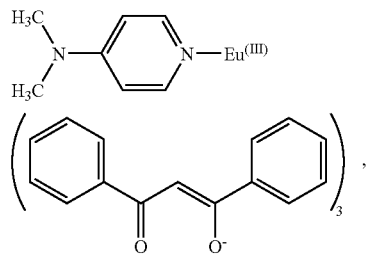
(XII)

1 g of compound XII (prepared according to WO96/20942) is dissolved in 99 g of 1,2-propyleneglykol under heating at 100° C. for 1 hour. The clear yellow solution is allowed to cool down and after filtration (clarification) provides the stable ink Composition A which exhibits an intense red luminescence under UV light. This concentrate can be further used in either solvent based or aqueous based conventional or high-tech (ink-jet) printing formulations for paper, textile, leather, wood, plastic or other compatible substrates.

EXAMPLE 1

A colourless aqueous ink-jet ink is prepared by diluting 6 parts by weight of ink Composition A with 4 parts by weight of a standard polyurethane-acrylate aqueous ink-jet ink formulation. The above described quasi-colourless formulation is printed on white paper, coloured paper, white or coloured textiles and results in a strong red luminescence under UV exposure.

EXAMPLE 2

A pigmentary yellow aqueous ink-jet ink is prepared by diluting 1 part of ink Composition A with 1 part of a standard commercial polyurethane-acrylate pigmentary yellow aqueous ink-jet ink formulation.

The above-described yellow formulation was printed on white paper, coloured paper, white or coloured textiles and resulted in a strong red luminescence under UV exposure.

EXAMPLE 3

A pigmentary red aqueous ink-jet ink is prepared by diluting 3 parts of ink Composition A with 1 part of a standard commercial polyurethane-acrylate pigmentary red aqueous ink-jet ink formulation. The above-described red formulation is printed on white paper, coloured paper, white or coloured textiles and results in a strong red luminescence under UV exposure.

What is claimed is:

1. An ink composition containing (a) a compound of formula II, III or IV

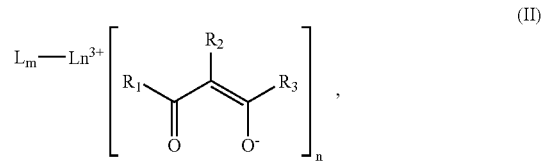
(II)

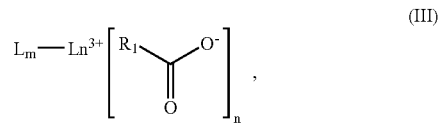
(III)

(IV)

wherein $R_2$, is hydrogen or $C_1$–$C_6$alkyl, and $R_1$ and $R_3$ are methyl, t-butyl, n-pentyl or phenyl, Ln represents a lanthanide, n denotes 3 or 4, m denotes a number from 1 to 4, when n is 3, m denotes a number from 1 to 4, when n is 4, m denotes 1, L is a compound of formula V, VI, VII, VIII or IX

(V)

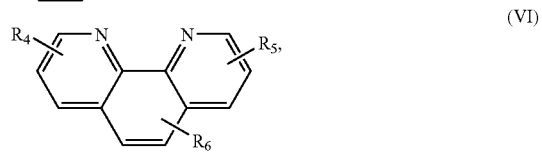
(VI)

-continued

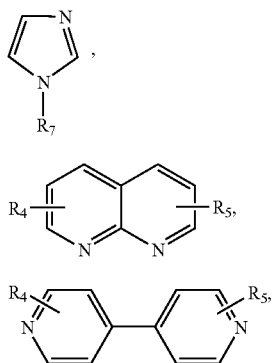
(VII)

(VIII)

(IX)

wherein $R_4$, $R_5$ and $R_6$ are each independently of the other hydrogen, halogen, $C_1$–$C_6$alkyl, $C_5$–$C_{24}$aryl, $C_6$–$C_{24}$aralkyl, $C_1$–$C_6$alkoxy, dialkylamino or a cyclic amino group and $R_7$ is hydrogen, $C_1$–$C_6$alkyl, $C_5$–$C_{24}$aryl or $C_6$–$C_{24}$aralkyl: and (b) a liquid ink carrier.

2. An ink composition according to claim 1 containing as component (a) a compound of formula II, wherein $R_2$ is hydrogen.

3. An ink composition according to claim 1 containing as component (a) a compound of formula X, XI, XII, XIII, XIV or XV

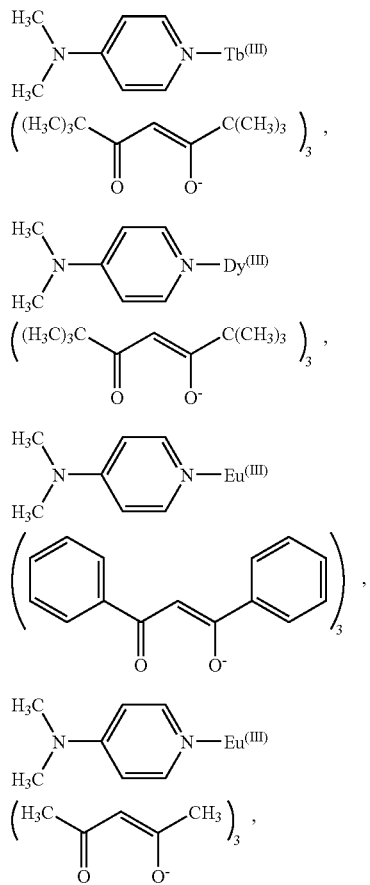

(X)

(XI)

(XII)

(XIII)

-continued

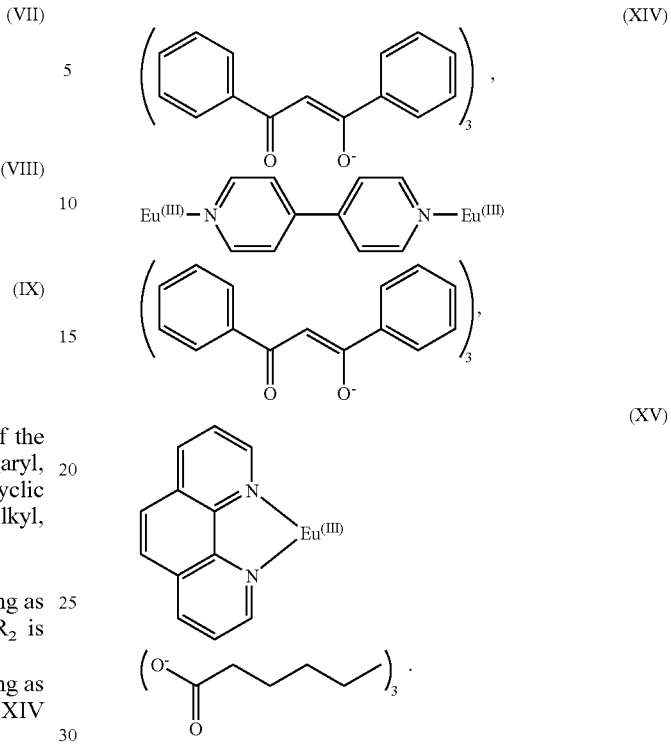

(XIV)

(XV)

4. An ink composition according to claim 1 containing as component (b) one or more organic solvents or a mixture of water and one or more organic solvents.

5. An ink composition according to claim 4 containing as organic solvent an aliphatic alcohol, an etheralcohol, glycol, dimethylsulfoxide (DMSO), dimethylformamide (DMF), dimethylacetamide (DMA), an aliphatic or aromatic ketone, an aromatic hydrocarbon, a carboxylic acid ester or an aliphatic polyether.

6. An ink composition according to claim 4 containing as organic solvent a water-miscible solvent.

7. An ink composition according to claim 4 containing as organic solvent ethylene glycol or propylene glycol.

8. An ink composition according to claim 1 additionally containing (c) a binder resin.

9. An ink composition according to claim 8 wherein the binder resin (c) is selected from the group consisting of polyacrylics, polyacrylates, polyurethanes, polyurethane-acrylates, styrene-acrylic copolymers, nitrocellulose and ethylcellulose.

10. An ink composition according to claim 1 containing 0.01 to 70.0 % by weight of component (a) and 30.0 to 99.99 % by weight of component (b), based on the total amount of components (a)+(b).

11. An ink composition according to claim 8 containing 0.5 to 70 % by weight of component (c), based on the total amount of components (a)+(b)+(c).

12. An ink composition according to claim 1 containing additionally (d) one or more colorants.

13. A system for marking items with a hidden mark which can only be revealed under UV exposure comprising a printing means for printing said mark on said items, wherein said printing means employs an ink composition according to claim 1.

14. A method for providing a hidden mark on an object comprising applying onto said object an ink composition according to claim 1 and removing all or substantially all of said ink carrier by evaporation or absorption into said object.

15. A method according to claim 14 wherein said object is a textile material.

16. An ink composition according to claim 1 containing as component (a) a compound of formula I, wherein Ln is Eu, Tb or Dy.

17. An ink composition containing (a) a compound of formula (II), (III) or (IV)

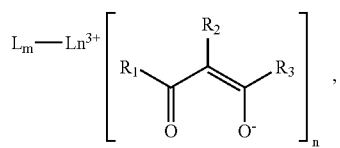

(II)

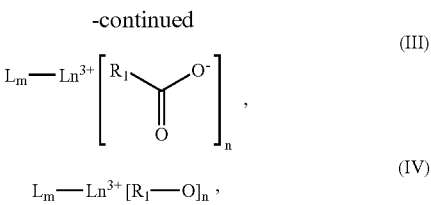

wherein
  Ln represents a lanthanide,
  n denotes 3 or 4, m denotes a number from 1 to 4,
  in case n is 3, m denotes a number from 1 to 4 and L is
    a neutral monodentate or polydentate nitrogen-, oxygen- or sulfur-containing UV-absorbing ligand with the exception of 2,2'-bipyridyl or, in case n is 4, m denotes 1 and L is a single-charged cation,
  $R_2$, is hydrogen or $C_1$–$C_6$alkyl, and
  $R_1$ and $R_3$ are each independently of the other methyl, t-butyl, n-pentyl or phenyl.

18. An ink composition according to claim 17 containing as component (a) a compound of formula I, wherein Ln is Eu, Tb or Dy.

* * * * *